United States Patent [19]

Tanaka et al.

[11] Patent Number: 4,929,277

[45] Date of Patent: May 29, 1990

[54] RECORDING LIQUID

[75] Inventors: Mitsugu Tanaka; Takeo Sakai, both of Tokyo, Japan

[73] Assignee: Fuji Photo Film Co., Ltd., Kanagawa, Japan

[21] Appl. No.: 217,205

[22] Filed: Jul. 11, 1988

[30] Foreign Application Priority Data

Jul. 10, 1987 [JP] Japan .............................. 62-172433

[51] Int. Cl.$^5$ .............................................. C09D 11/02

[52] U.S. Cl. ...................................... 106/22; 534/649; 534/676; 534/791; 534/753

[58] Field of Search .................. 106/22; 534/649, 676, 534/791, 753

[56] References Cited

U.S. PATENT DOCUMENTS

| | | | |
|---|---|---|---|
| 3,344,133 | 9/1967 | Bossord et al. | 543/753 |
| 3,579,498 | 5/1971 | Dunworth | 534/753 |
| 4,043,752 | 8/1977 | Kilmurry et al. | 534/676 |
| 4,139,343 | 2/1979 | Steiner | 106/22 |
| 4,200,570 | 4/1980 | Steiner | 106/22 |
| 4,209,297 | 6/1980 | Stephan et al. | 106/22 |
| 4,234,481 | 11/1980 | Steiner | 106/22 |
| 4,425,162 | 1/1984 | Sugiyama et al. | 106/22 |

FOREIGN PATENT DOCUMENTS

| | | | |
|---|---|---|---|
| 0683298 | 3/1964 | Canada | 534/753 |
| 0955085 | 4/1964 | United Kingdom | 534/753 |

*Primary Examiner*—Prince E. Willis
*Assistant Examiner*—Helene Klemanski
*Attorney, Agent, or Firm*—Sughrue, Mion, Zinn, Macpeak & Seas

[57] ABSTRACT

A recording liquid comprising an organic solvent and at least one compound represented by formula (I):

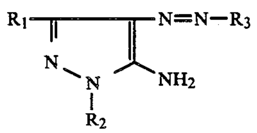

(I)

wherein $R_1$ represents a hydrogen atom, an alkyl group, an alkoxy group, an aryl group, a carboxylic acid ester group or a carbamoyl group; $R_2$ represents a hydrogen atom, an alkyl group or an aryl group; and $R_3$ represents an aryl group provided that none of $R_1$, $R_2$ and $R_3$ is substituted with a sulfonic acid group. The yellow recording liquid has good color and excellent light resistance with good solubility.

13 Claims, No Drawings

RECORDING LIQUID

FIELD OF THE INVENTION

This invention concerns non-aqueous (or oil based) recording liquids having an organic solvent as the principal component.

BACKGROUND OF THE INVENTION

Various recording liquids have been used for ball point pens, felt-tipped pens, fountain pens and ink-jet purposes, and solutions or dispersions of dyes or pigments in water or organic solvents have been used for this purpose.

In the case of a liquid medium in which the recording liquid has water as the principal component, a water soluble colorant is dissolved in the medium using water, or water and a small quantity of organic solvent, for use. However, in the case of a water based recording liquid, the absorption properties on papers which have a high degree of sizing is poor and the writing properties are not good. Furthermore, the recorded image has no water resistance and its handling properties are poor. Furthermore, resolution is reduced as a result of smudging, and there is a further disadvantage in that when forming a colored image, the different colored recording liquids smudge and combine on the recording material, and the brightness of the colors tends to be reduced. It is known that non-aqueous recording liquids obtained by dissolving an oil soluble colorant in a liquid medium having an organic solvent as the main component can be used to overcome these disadvantages. However, colorants which satisfy all or most of the requirements of hue, light resistance and solubility have not been found among the known oil soluble yellow colorants which have been used in conventional non-aqueous recording liquids.

SUMMARY OF THE INVENTION

An object of the invention is to overcome the aforementioned disadvantages and to provide recording liquids which have especially good color, light resistance, and dissolution properties.

A further object is to provide a recording liquid providing a dense yellow image.

It now has been found that these and other objects of the present invention can be attained by recording liquids containing an organic solvent and at least one compound represented by formula (I):

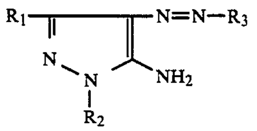

(I)

In this formula, $R_1$ represents a hydrogen atom, an alkyl group containing from 1 to 21 carbon atoms, an alkoxy group containing from 1 to 21 carbon atoms, an aryl group containing from 6 to 30 carbon atoms, a carboxylic acid ester group containing from 2 to 23 carbon atoms or a carbamoyl group containing from 2 to 23 carbon atoms; $R_2$ represents a hydrogen atom, an alkyl group containing from 1 to 21 carbon atoms or an aryl group containing from 6 to 30 carbon atoms; and $R_3$ represents an aryl group containing from 6 to 30 carbon atoms, provided that none of $R_1$, $R_2$ and $R_3$ is substituted with a sulfonic acid group.

DETAILED DESCRIPTION OF THE INVENTION

Each of the above mentioned alkyl groups may be linear chain, branched or cyclic alkyl groups. Furthermore, each of the above mentioned alkyl groups and aryl groups may be substituted with one or more alkyl group, alkoxy group, aryloxy group, aralkyl group, aryl group, halogen atom, cyano group, nitro group, carboxylic acid ester group, carbamoyl group, acyl group, acylamino group, sulfonyl group, sulfamoyl group, sulfonamido group, amino group, alkylamino group or arylamino group.

The compounds used in the invention represented by formula (I) preferably are substituted with at least one oil solubilizing group to increase their oil solubility.

The oil solubilizing groups are alkyl groups which have from 5 to 30 carbon atoms and which may be unsubstituted or substituted with alkyl groups, alkoxy groups, aryloxy groups, aralkyl groups, aryl groups, halogen atoms, cyano groups, nitro groups, ester groups, carbamoyl groups, acyl groups, acylamino groups, sulfonyl groups, sulfamoyl groups, sulfonamido groups, amino groups, alkylamino groups, arylamino groups or hydroxyl groups as substituents groups; or are substituted aryl groups (substituted with the same substituent groups as indicated above) which have from 10 to 35 carbon atoms, which are bonded onto the colorant part itself in order to render the colorant more readily soluble in non-aqueous media.

These alkyl groups or aryl groups may be bonded directly onto the colorant part itself or they may be bonded via an ether group, ester group, carbamoyl group, acyl group, acylamino group, sulfonyl group, sulfamoyl group, sulfonamido group, amino group or an alkylamino group.

The oil solubilizing groups used in this invention preferably do not contain groups which are liable to undergo a redox reaction or a hydrolysis reaction. Such groups include, for example, hydroquinone groups, p-aminophenol groups, etc. The compounds included in the recording liquids of this invention represented by formula (II) are preferred:

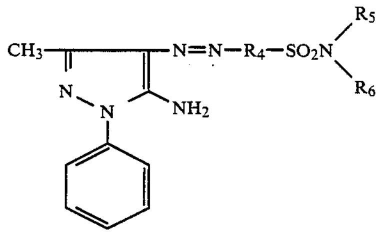

(II)

In this formula, $R_4$ represents an unsubstituted phenylene group or a phenylene group substituted with one or two chlorine atoms; and $R_5$ an $R_6$, which may be the same or different, each represents a hydrogen atom, a linear chain, branched chain or cyclic alkyl group containing from 1 to 21 carbon atoms; or an aryl group containing from 6 to 25 carbon atoms, and $R_5$ and $R_6$ may be joined together to form a five-membered or six-membered saturated heterocyclic ring.

These alkyl groups and aryl groups represented by $R_5$ and $R_6$ may be unsubstituted or substituted with one or more alkyl groups, alkoxy groups, aryloxy group, aralkyl group, aryl groups, halogen atoms, cyano groups, nitro groups, carboxylic acid ester groups, carbamoyl groups, acyl groups, acylamino groups, sulfonyl groups, sulfamoyl groups, sulfonamido groups, amino groups, alkylamino groups or arylamino groups.

Specific examples of compounds which can be used in the invention are indicated in Table 1, but the present invention is not to be construed as being limited thereto.

Moreover, specific examples of the substituent groups of general formula (I) are shown for the compounds in this table.

TABLE 1

| Compound No. | $R_1$ | $R_2$ | $R_3$ |
|---|---|---|---|
| 1 | $-CH_3$ | 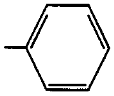 | 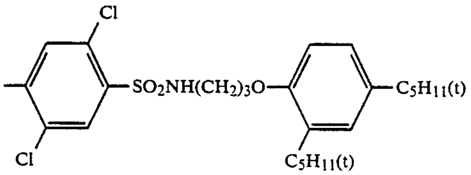 |
| 2 | $-CH_3$ | 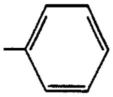 | 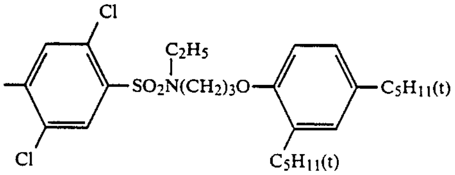 |
| 3 | $-CH_3$ | 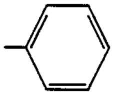 | 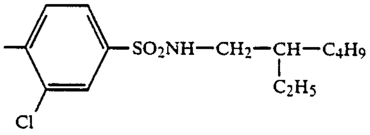 |
| 4 | $-C_2H_5$ | 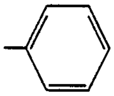 | 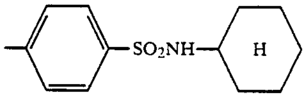 |
| 5 | $-CH_3$ | 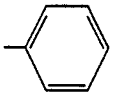 | 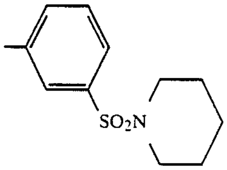 |
| 6 | $-CH_3$ | 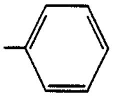 | 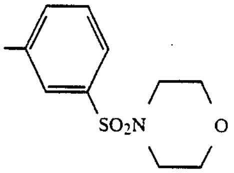 |
| 7 | $-CH_3$ | 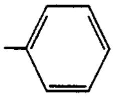 | 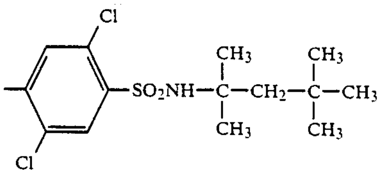 |
| 8 | $-CH_3$ | 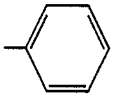 | 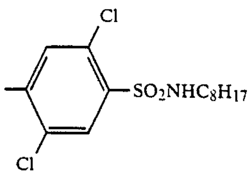 |

TABLE 1-continued
| Compound No. | $R_1$ | $R_2$ | $R_3$ |
|---|---|---|---|
| 9 | $-CH_3$ | $-CH_3$ | 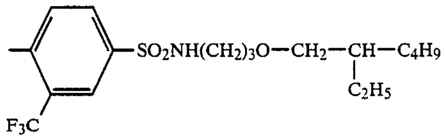 |
| 10 | $-COOC_2H_5$ | 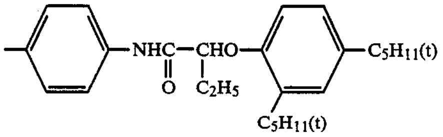 | 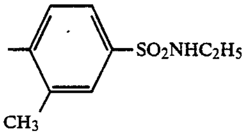 |
| 11 | $-CONHC_5H_{11}$ | 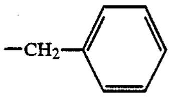 | 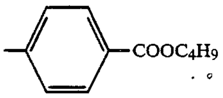 |
| 12 | 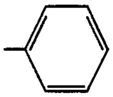 | 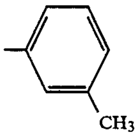 | 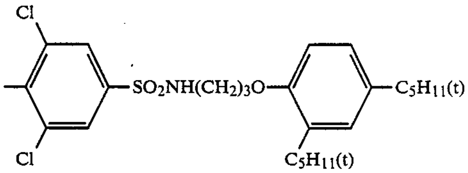 |
| 13 | $-CH_3$ | 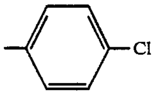 | 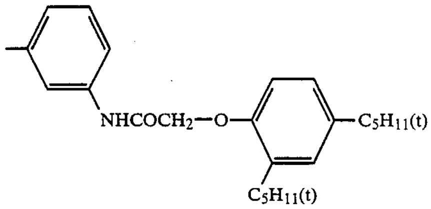 |
| 14 | $-CH_3$ | $-CH_2CH_2-CN$ | 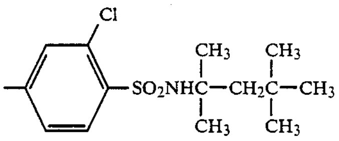 |
| 15 | $-CH_3$ | 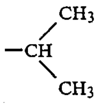 | 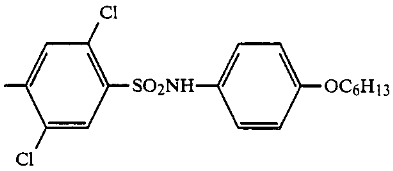 |
| 16 | $-CH_3$ | 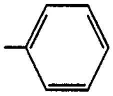 | 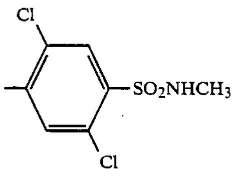 |
| 17 | " | " | 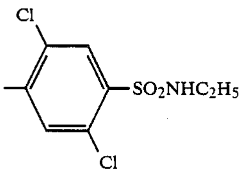 |

TABLE 1-continued

| Compound No. | $R_1$ | $R_2$ | $R_3$ |
|---|---|---|---|
| 18 | " | " | 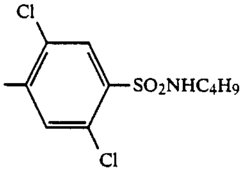 |
| 19 | " | " | 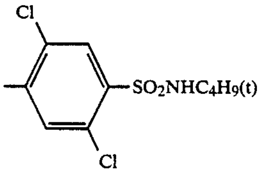 |
| 20 | " | " | 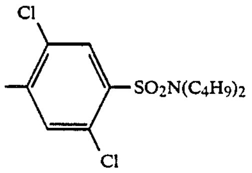 |
| 21 | $-CH_3$ | 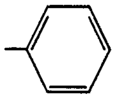 | 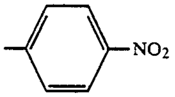 |
| 22 | " | " | 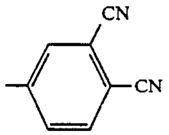 |

An example of the synthesis of a compound which can be used in the invention is described below, and this method can easily be used to synthesize the remaining compounds according to the invention by appropriate and evident substitution of starting materials.

SYNTHESIS EXAMPLE

Synthesis of Compound No. 1

5-Amino-4-(4-chlorosulfonyl-2,5-dichloro-phenylazo)3-methyl-1-phenyl-pyrazole (5.0 g), 10.0 g of 3-(2,4-di-tert-amylphenoxy)propylamine and 50 ml of N,N-dimethylacetamide were stirred together at room temperature for a period of 1 hour. The reaction mixture was then poured into 200 ml of water and extracted with 100 ml of ethyl acetate. The extract was washed twice with water, after which the ethyl acetate was removed by distillation and the residue was purified using silica gel chromatography with chloroform as the developing solvent. The product obtained was then crystallized from methanol and 6.3 g of the desired compound was obtained.

Melting point: 112° to 114° C.

Conventional organic solvents, selected appropriately according to requirements, can be used for the liquid medium of the recording liquids in which the invention is used. Specific examples include, for example, alcohols such as ethanol, pentanol, heptanol, octanol, cyclohexanol, benzyl alcohol, phenylethyl alcohol, phenylpropyl alcohol, furfuryl alcohol, anise alcohol, etc.; glycol derivatives such as ethylene glycol monoethyl ether, ethylene glycol monophenyl ether, diethylene glycol monoethyl ether, diethylene glycol monobutyl ether, propylene glycol monoethyl ether, propylene glycol monophenyl ether, dipropylene glycol monomethyl ether, dipropylene glycol monoethyl ether, ethylene glycol diacetate, ethylene glycol monomethyl ether acetate, diethylene glycol monoethyl acetate, propylene glycol diacetate, etc.; ketones such as benzyl methyl ketone, benzylacetone, diacetone alcohol, cyclohexanone, etc.; ethers such as butyl phenyl ether, benzyl ethyl ether, etc.; esters such as ethyl acetate, amyl, acetate, benzyl acetate, phenylethyl acetate, phenoxyethyl acetate, ethyl phenylacetate, benzyl propionate, ethyl benzoate, butyl benzoate, ethyl laurate, butyl laurate, isopropyl myristate, isopropyl palmitate, triethyl phosphate, tributyl phosphate, dimethyl phthalate, diethyl phthalate, dibutyl phthalate, diethyl malonate, dipropyl malonate, diethyl diethylmalonate, diethyl succinate, dibutyl succinate, dimethyl glutarate, diethyl glutarate, diethyl adipate, dipropyl adipate, dibutyl adipate, di-(2-methoxyethyl) adipate, diethyl sebacate, diethyl maleate, dibutyl maleate, dioctyl maleate, dibutyl fumarate, dioctyl fumarate, 3-hexenyl cinnamate, etc.; a hydrocarbon solvent such as petroleum ether, petroleum benzine, tetralin, decalin, t-amylbenzene, dimethylnaphthalene, etc.; and polar solvents such as acetonitrile, formamide, N,N-dimethylformamide, dimethyl sulfoxide, sulfolane, propylene carbonate, N-methyl-2-pyrrolidone, N-ethyl-2-pyrrolidone, N-vinyl-2-pyrrolidone, N,N-diethyldodecanamide, etc. These solvents can be used individually, or in the form of mixtures of two or more. Those solvents which contain two ester groups are preferred, and those of which the boiling point is at least about 140° C. are especially desirable.

Recording liquids which contain from 2% to 50% by weight of alcohols, glycol derivatives, ketones, polar solvents, etc. which have a comparatively low electrical resistance (about $10^4$ to $10^7$ Ω·cm) are especially desirable when they are to be used in ink-jet recording apparatus in which electrostatics are employed.

Various conventional additives can be added appropriately as required in the recording liquids of this invention. These additives include viscosity modifying agent as disclosed in JP-A-58-2365 and JP-A-58-108271, surface tension modifying agents as disclosed in JP-A-47-30407, JP-A-50-84311 and JP-A-56-167774, specific resistance modifying agents as disclosed in JP-A-49-107539, JP-A-55-50073 and JP-A-60-118767, film forming agents, ultraviolet a antioxidants as disclosed in JP-A-61-126186, anti-fading agents as disclosed in JP-A-62-106971, etc. (The term "JP-A" as used herein means an "unexamined published Japanese patent application".)

The yellow colored recording liquids of this invention can be used together with magenta and cyan colored recording liquids in order to form full color images. Furthermore, they can also be used together with black colored recording liquids in order to adjust the color tone. The colorants which can be used in these recording liquids include, for example, magenta, cyan and black colorants selected from among the colorants disclosed, for example, in JP-A-63-69875 (for example, various azo colorants, such as the mono-azo, poly-azo, metal complex salt azo, pyrazoloazone-azo, aminopyrazole-azo, stilbene-azo and thiazole-azo based colorants; anthraquinone colorants including anthrone and anthraquinone derivatives; indigoide colorants including indigo and thioindigo derivatives; phthalocyanine colorants; carbonium colorants such as the diphenylmethane, triphenylmethane, xanthene and acridine based colorants; quinoneimide colorants such as the azine, oxazine and thiazine based colorants; methine colorants, such as the poly-methine and azo-methine based colorants; benzoquinone and naphthoquinone colorants; naphthylimide colorants; perynone colorants, etc.), but the use of those indicated below is especially preferred.

Magenta Colorants: The magenta colored nickel chelate colorants represented by the general formula (C1) below disclosed in JP-A-62-252483 which corresponds to U.S. patent application Ser. No. 041,493.

(C1)

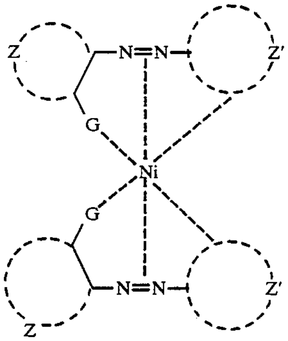

In this formula, each Z and Z′ represents an atomic group necessary for forming at least one five-membered to seven-membered aromatic ring or heterocyclic ring, each of which is unsubstituted or substituted with at least one alkyl group, alkoxy group, aryloxy group, aralkyl group, aryl group, halogen atom, cyano group, nitro group, ester group, carbamoyl group, acyl group, acylamino group, sulfonyl group, sulfamoyl group, sulfonamido group, amino group, alkylamino group, arylamino group or hydroxyl group; provided that each ring formed by Z′ contains a member adjacent to the member bonded to the azo group selected from (i) a nitrogen atom which functions as a chelating site, and (ii) a carbon atom which is bonded directly to a nitrogen atom which functions as a chelating site. The aromatic ring or the heterocyclic ring formed by Z′ can be unsubstituted or substituted with one or more of the same substituent groups as indicated for Z above. G represents a metal chelating group.

Cyan Colorants: Oil soluble indoaniline colorants as disclosed in JP-A-59-182839, or the oil soluble alkylsulfamoyl substituted copper phthalocyanine colorants disclosed in JP-A-50-44226.

Black Colorants: Black colorants represented by the general formula (C2) indicated below, as disclosed in JP-A-57-5770 which corresponds to U.S. Pat. No. 4,388,115.

(C2)

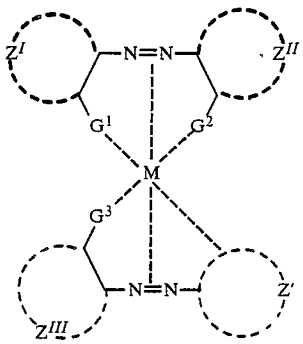

In this formula, $Z^I$, $Z^{II}$, $Z^{III}$, and Z′ which may be the same or different, each represents an atomic group necessary for forming at least one five-membered to seven-membered aromatic ring or heterocyclic ring, provided that the ring formed by Z′ contains a member adjacent to the member bonded to the azo group selected from (i) a nitrogen atom which functions as a chelating site, and (ii) a carbon atom which is bonded directly to a nitrogen atom which is capable of chelating with M. $G^1$, $G^2$ and $G^3$, which may be the same or different, each group which has one negative charge capable of chelating with M. M represents a trivalent, six coordinate metal ion.

The recording liquids of this invention can be used in various types of ink-jet recording apparatus with the appropriate addition of liquid media components or various additives providing the prescribed physical properties.

In cases where the recording liquids of this invention are to be used in ink-jet recording apparatus in which static electricity is used, the specific resistance is preferably adjusted to about $10^5$ to $10^{11}$ Ω·cm, and adjustment to about $10^6$ to $10^8$ Ω·cm is especially preferred. The concentration of the compound represented by formula (I) or (II) is preferably from about 1% to 20%, and a concentration of from about 3% to 10% is especially preferred.

The recording liquids of this invention can also be used as recording liquids other than inks for ink-jet purposes, for example, as recording liquids for writing purposes (as ball point pen inks).

Conventional papers are normally used as the record supports on which a recording is made with a recording liquid of this invention, but it is possible to use supports such as cloths, plastic films, metal sheets, wooden boards, glass plates, etc. Paper consists principally of wood pulp, and this may be mixed, as required, with synthetic fibers, synthetic pulp, inorganic fibers, etc. Furthermore, sheets which have a suitable ink absorbing layer established on the surface of the support give preferred results since the recording liquid then permeates into the material to a suitable extent.

The conventional ink absorbing layers consisting in the main of a pigment and a binding agent can be used conveniently. The pigment may be, for example, clay, talc, calcium carbonate, calcium sulfate, calcium silicate, zinc oxide, kaolin, aluminum silicate, magnesium silicate, acid clay, magnesium oxide, magnesium carbonate, alumina, silica, or organic pigments, etc. The binding agent may be casein, starch, gelatin, PVA, carboxymethyl cellulose, hydroxyethyl cellulose, styrene-butadiene latex, methyl methacrylate, butadiene latex, vinyl acetate based latex, polyacrylic based latex, etc.

The invention is described in greater detail below by means of specific examples, but the present invention is not to be construed as limiting thereto. Unless otherwise indicated, all parts, percents and ratios are by weight.

EXAMPLE 1

| | |
|---|---|
| Compound No. 1 of this invention | 6 parts |
| Diethyl phthalate | 30 parts |
| Di-isopropyl adipate | 44 parts |
| N,N-Diethyldodecanamide | 20 parts |

An ink was prepared by mixing the above mentioned components together and stirring to form a uniform liquid which was subsequently filtered through a filter of pore size 1 μm. The specific resistance of this ink was $3.6\times10^7$ Ω·cm, and its viscosity was 7.2 cp (both measured at 25° C.). This ink was used in an electrostatic acceleration type ink-jet apparatus fitted with a head having a nozzle hole diameter of 50 μm for printing in the form of eight rows of dots per millimeter onto an ink-jet recording paper which had a coated layer (10 μm thick) which contained principally fine silicon oxide particles (about 1.5 μm diameter) and poly(vinyl alcohol) (molecular weight: about 100,000) in proportions by weight of 75:25, whereupon a bright, high density yellow images was obtained. The reduction in density after leaving the image to stand in indoor light for 3 months was less than 3%. No running or flowing of the image was seen even when paper which had been printed with this ink was immersed in water for a period of 10 minutes.

The ink was introduced into a sealed glass container and stored at room temperature for 6 months, but no precipitation of dye was observed.

EXAMPLE 2

Inks (2-1) to (2-4) of which the compositions are indicated below were prepared in the same way as in Example 1.

| | |
|---|---|
| Ink (2-1) | |
| Compound No. 3 of this invention | 6 parts |
| n-Butyl diadipate | 74 parts |
| Benzyl alcohol | 20 parts |
| Ink (2-2) | |
| Compound No. 7 of this invention | 6 parts |
| Dibutyl maleate | 67 parts |
| Diethyl phthalate | 22 parts |
| N-methylpyrrolidone | 5 parts |
| Ink (2-3) | |
| Compound No. 15 of this invention | 6 parts |
| Diethyl adipate | 44 parts |
| Diethyl phthalate | 30 parts |
| Dipropylene glycol monomethyl ether | 20 parts |
| Ink (2-4) | |
| Compound No. 17 of this invention | 6 part |
| Diethyl phthalate | 30 parts |
| Diisopropyl adipate | 44 parts |
| N,N-diethyldodecaneamide | 20 parts |

These inks were printed onto ink-jet recording paper using the same electrostatic acceleration type ink-jet apparatus used in Example 1. Inks (2-1) to (2-4) exhibited good discharge properties and bright yellow images were obtained in each case. An ink-jet apparatus fitted with a head which was full of these inks was left to stand for 3 weeks, and on recommencing operation discharge of the ink occurred smoothly and bright, high density images like those obtained before stopping the apparatus were obtained. No running or flowing of the image was observed even on immersing the papers which had been printed with these inks in water for 10 minutes.

EXAMPLE 3

The inks (3-1) to (3-3) of which the compositions are indicated below were prepared in the same way as in Example 1.

| | |
|---|---|
| Ink (3-1) | |
| Oil soluble magenta colorant (see below) | 5 parts |
| Diethyl phthalate | 30 parts |
| Di-isopropyl adipate | 45 parts |
| N,N-Diethyldodecanamide | 20 parts |
| Ink (3-2) | |
| Oil soluble cyan colorant (see below) | 5 parts |
| Diethyl phthalate | 28 parts |
| Di-isopropyl adipate | 45 parts |
| N,N-Diethyldodecanamide | 22 parts |
| Ink (3-3) | |
| Oil soluble black colorant (see below) | 6 part |
| Diethyl phthalate | 32 parts |
| Di-isopropyl adipate | 45 parts |
| N,N-Diethyldodecanamide | 17 parts |

Each of these inks, together with the ink of Example 1, was printed onto an ink-jet printing paper using the same electrostatic acceleration type ink-jet apparatus as used in Example 1. The parts printed by the inks (3-1) and (3-2), and by the ink of Example 1, individually, formed bright magenta, cyan and yellow images, respectively, and the parts where two types of ink overlapped formed bright green, blue and red images. Furthermore, color reproduction of the intermediate colors was satisfactory. The part printed with the ink (3-3) alone formed a high density black image, and the parts where this ink overlapped with the inks mentioned above formed colored images which had good "blacking".

(Oil Soluble Magenta Colorant)

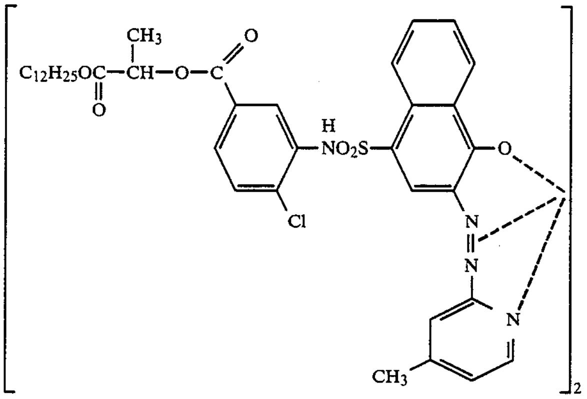

(Oil Soluble Cyan Colorant)

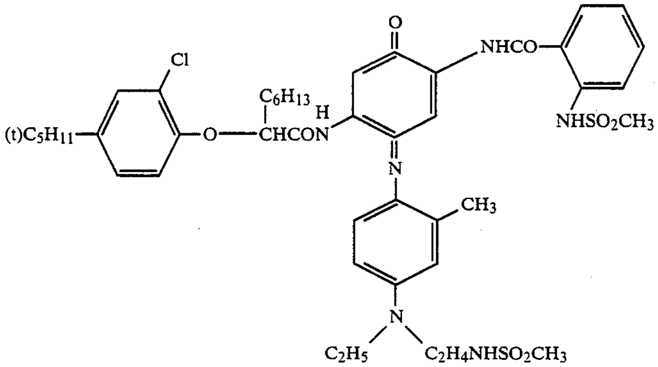

(Oil Soluble Black Colorant)

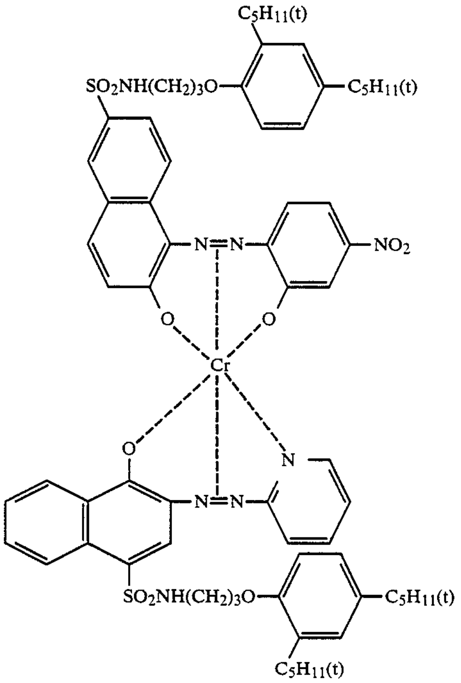

While the invention has been described in detail and with reference to specific embodiments thereof, it will be apparent to one skilled in the art that various changes and modifications can be made therein without departing from the spirit and scope thereof.

What is claimed is:

1. A recording liquid comprising an organic solvent and at least one compound represented by formula (I):

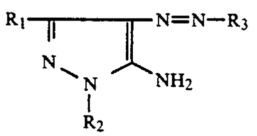

(I)

wherein $R_1$ represents a hydrogen atom, an alkyl group, an alkoxy group, an aryl group, a carboxylic acid ester group or a carbamoyl group; $R_2$ represents a hydrogen atom, an alkyl group or an aryl group; and $R_3$ represents an aryl group; provided that none of $R_1$, $R_2$ and $R_3$ is substituted with a sulfonic acid group wherein said liquid has a specific resistance of from about $10^5$ to $10^{11}$ Ωcm.

2. The recording liquid as claimed in claim 1, wherein the alkyl group has from 1 to 21 carbon atoms, the alkoxy group has from 1 to 21 carbon atoms, the aryl group has from 6 to 30 carbon atoms, the carboxylic acid ester group has from 2 to 23 carbon atoms, and the carbamoyl group has from 2 to 23 carbon atoms.

3. The recording liquid as claimed in claim 1, wherein each said alkyl group and aryl group is unsubstituted or substituted with at least one alkyl group, alkoxy group, aryloxy group, aralkyl group, aryl group, halogen atom, cyano group, nitro group, carboxylic acid ester group, carbamoyl group, acyl group, acylamino group, sulfonyl group, sulfamoyl group, sulfonamido group, amino group, alkylamino group, or arylamino group.

4. The recording liquid as claimed in claim 1, wherein said compound represented by formula (I) contains at least one oil solubilizing group.

5. The recording liquid as claimed in claim 4, wherein said oil solubilizing group is selected from a substituted or unsubstituted alkyl group containing from 5 to 30 carbon atoms and a substituted aryl group having from 10 to 35 carbon atoms, each said substituent being selected from an alkyl group, an alkoxy group, an aryloxy group, an aralkyl group, an aryl group, a halogen atom, a cyano group, a nitro group, an ester group, a carbamoyl group, an acyl group, an acylamino group, a sulfonyl group, a sulfamoyl group, a sulfonamido group, an amino group, an alkylamino group, an arylamino group and a hydroxyl group:

6. The recording liquid as claimed in claim 1, wherein said compound represented by formula (I) is represented by formula (II):

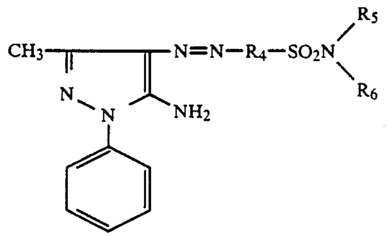

(II)

wherein $R_4$ represents an unsubstituted phenylene group or a phenylene group substituted with one or two chlorine atoms; and $R_5$ and $R_6$, which may be the same or different, each represents a hydrogen atom, an alkyl group containing from 1 to 21 carbon atoms, or an aryl group containing from 6 to 25 carbon atoms, and $R_5$ and $R_6$ may be linked to form a five-membered or six-membered saturated heterocyclic ring.

7. The recording liquid as claimed in claim 6, wherein each said alkyl group and aryl group represented by $R_5$ and $R_6$ is unsubstituted or substituted with at least one substituent selected from the group consisting of an alkyl group, an alkoxy group, an aryloxy group, an aralkyl group, an aryl group, a halogen atom, a cyano group, a nitro group, a carboxylic acid ester group, a carbamoyl group, an acyl group, an acylamino group, a sulfonyl group, a sulfamoyl group, a sulfonamido group, an amino group, an alkylamino group and an arylamino group.

8. The recording liquid as claimed in claim 1, wherein said organic solvent is selected from the group consisting of an alcohol, a glycol derivative, a ketone, an ether, an ester, a hydrocarbon solvent and a polar solvent.

9. The recording liquid as claimed in claim 8, wherein said solvent contains at least two ester groups and has a boiling point of at least about 140° C.

10. The recording liquid as claimed in claim 1, comprising from about 1 to 20 wt % of said compound represented by formula (I).

11. The recording liquid as claimed in claim 9, comprising from about 3 to 10 wt % of said compound represented by formula (I).

12. The recording liquid as claimed in claim 1, having a specific resistance of from about $10^6$ to $10^8$ Ω·cm.

13. The recording liquid as claimed in claim 1, wherein said organic solvent is an ester.

* * * * *